US009207919B2

(12) United States Patent
Diamos

(10) Patent No.: US 9,207,919 B2
(45) Date of Patent: Dec. 8, 2015

(54) SYSTEM, METHOD, AND COMPUTER PROGRAM PRODUCT FOR BULK SYNCHRONOUS BINARY PROGRAM TRANSLATION AND OPTIMIZATION

(71) Applicant: NVIDIA Corporation, Santa Clara, CA (US)

(72) Inventor: Gregory Frederick Diamos, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/158,749

(22) Filed: Jan. 17, 2014

(65) Prior Publication Data

US 2015/0205586 A1   Jul. 23, 2015

(51) Int. Cl.
*G06F 9/45*    (2006.01)
*G06F 9/30*    (2006.01)

(52) U.S. Cl.
CPC .............. *G06F 8/41* (2013.01); *G06F 9/30181* (2013.01)

(58) Field of Classification Search
None
See application file for complete search history.

(56) References Cited

U.S. PATENT DOCUMENTS

| 7,395,418 | B1* | 7/2008 | Caprioli et al. | 712/228 |
|---|---|---|---|---|
| 2004/0054992 | A1* | 3/2004 | Nair et al. | 717/138 |
| 2012/0254846 | A1* | 10/2012 | Moir et al. | 717/152 |
| 2013/0125097 | A1* | 5/2013 | Ebcioglu et al. | 717/136 |
| 2013/0219057 | A1* | 8/2013 | Li et al. | 709/224 |
| 2014/0379993 | A1* | 12/2014 | Gupta et al. | 711/135 |
| 2015/0026687 | A1* | 1/2015 | Yim et al. | 718/102 |

* cited by examiner

*Primary Examiner* — Don Wong
*Assistant Examiner* — Daxin Wu
(74) *Attorney, Agent, or Firm* — Zilka-Kotab, PC

(57) ABSTRACT

A system, method, and computer program product are provided for. The method includes the steps of executing a block of translated binary instructions by multiple threads and gathering profiling data during execution of the block of translated binary instructions. The multiple threads are then synchronized at a barrier instruction associated with the block of translated binary instructions and the block of translated binary instructions is replaced with optimized binary instructions, where the optimized binary instructions are produced based on the profiling data.

16 Claims, 11 Drawing Sheets

SYSTEM, METHOD, AND COMPUTER PROGRAM PRODUCT FOR BULK SYNCHRONOUS BINARY PROGRAM TRANSLATION AND OPTIMIZATION

This invention was made with Government support under LLNS subcontract B599861 awarded by DOE, and with Government support under Agreement HR0011-13-3-0001 awarded by DARPA. The Government has certain rights in this invention.

FIELD OF THE INVENTION

The present invention relates to program optimization, and more particularly to dynamic program optimization in a parallel system.

BACKGROUND

Conventional dynamic program optimization systems use profiling information to compile optimized regions of a program, and direct program control flow to the optimized regions during execution of the program. Execution of the optimized regions typically results in higher performance for the program. While some program optimizations may be determined without profiling information, the profiling information enables execution-specific optimizations.

A specific example of a dynamic program optimization is trace scheduling. The profiling information may record the number of times that common paths through the program are taken by an execution thread. When trace scheduling is performed, the most frequently executed paths are identified and optimized by placing the frequently executed paths in sequence and implementing instruction scheduling along the entire path (rather than along any other path that might intersect the selected trace). Once the optimized trace is translated into binary instructions, the binary instructions corresponding to the optimized trace may be executed instead of the original binary instructions.

To enable execution of the optimized trace, the conventional dynamic program optimization system halts execution of the program and, while the program is halted, the region of the program may be replaced with the optimized representation of the region, so that subsequently, the optimized representation is executed for the region. Specifically, the program may be patched so that branches to the original binary instructions are redirected to the binary instructions corresponding to the optimized trace.

The conventional dynamic program optimization process typically relies on switching back and forth between execution and optimization phases. The optimization phase requires exclusive access to the program that is being optimized, so execution of the program is halted during the optimization phase. Halting execution of a program during optimization phases is not a large burden when the program is executed on a sequential processor, such as a conventional central processing unit (CPU) that is single-threaded, because the sequential processor can only execute one thread at a time, where the execution and optimization phases correspond to two different threads.

In contrast with the conventional CPUs, parallel systems, such as graphics processing units (GPUs) are implemented with a large number of cores arranged in a highly parallel architecture. These circuits are typically specialized to process large sets of data in parallel, especially graphics data. For example, a highly parallel GPU may be configured with eight or more cores and each core may be configured to simultaneously execute at least 32 threads, so that the GPU may simultaneously execute at least 256 threads.

As previously explained, in a sequential processor, branches may be redirected to execute an optimized trace the next time that the original binary instructions are executed. However, in parallel processors that execute multiple threads simultaneously, at any time, a thread may be executing a particular branch that will be redirected as a result of an optimization. To ensure that threads are not executing a branch while the branch is being modified to redirect the branch, instruction memory pages that contain the branch instruction to be patched should be read protected. Read protecting the instruction memory pages causes threads that access the instruction memory pages to fault and be suspended by the system software until the modification is completed. Using read protection enables correct execution during dynamic program optimization, but also introduces high overhead for parallel processors with a large number of threads because many threads may be suspended. Suspending execution of 256 or more threads to perform dynamic program optimization may result in a performance reduction that cannot be overcome by the optimization. Thus, there is a need for addressing these issues and/or other issues associated with the prior art.

SUMMARY

A system, method, and computer program product are provided for dynamically optimizing a binary program. The method includes the steps of executing a block of translated binary instructions by multiple threads and gathering profiling data during execution of the block of translated binary instructions. The multiple threads are then synchronized at a barrier instruction associated with the block of translated binary instructions and the block of translated binary instructions is replaced with optimized binary instructions, where the optimized binary instructions are produced based on the profiling data.

DETAILED DESCRIPTION

Programs executed by a highly parallel GPU may be configured to synchronize a group of threads at a barrier. The barrier functions to synchronize all of the threads in the group at the same binary program instruction. Hence, the barrier performs a bulk synchronization operation. When the threads are synchronized, communication operations may be performed to exchange information between the different threads in the group. For example, a first one of the threads may have computed a value needed by other threads in the group. The first thread computes the value prior to reaching the barrier and the value is available to be read by the other threads following the barrier.

Once the threads are synchronized and before execution of translated binary instructions following the barrier begins, the threads are not executing the translated binary instructions and a block of the translated binary instructions may be replaced with optimized binary instructions. The optimized binary instructions may be dynamically produced for a block of translated binary program instructions during execution of the block of binary program instructions by modifying a copy of the translated binary program instructions to minimize the number of clock cycles before execution resumes after the threads in the group are synchronized at the barrier. The optimized binary instructions may be further optimized and replaced by another set of optimized binary instructions that are dynamically produced when the optimized binary instructions are executed.

Figure 1:
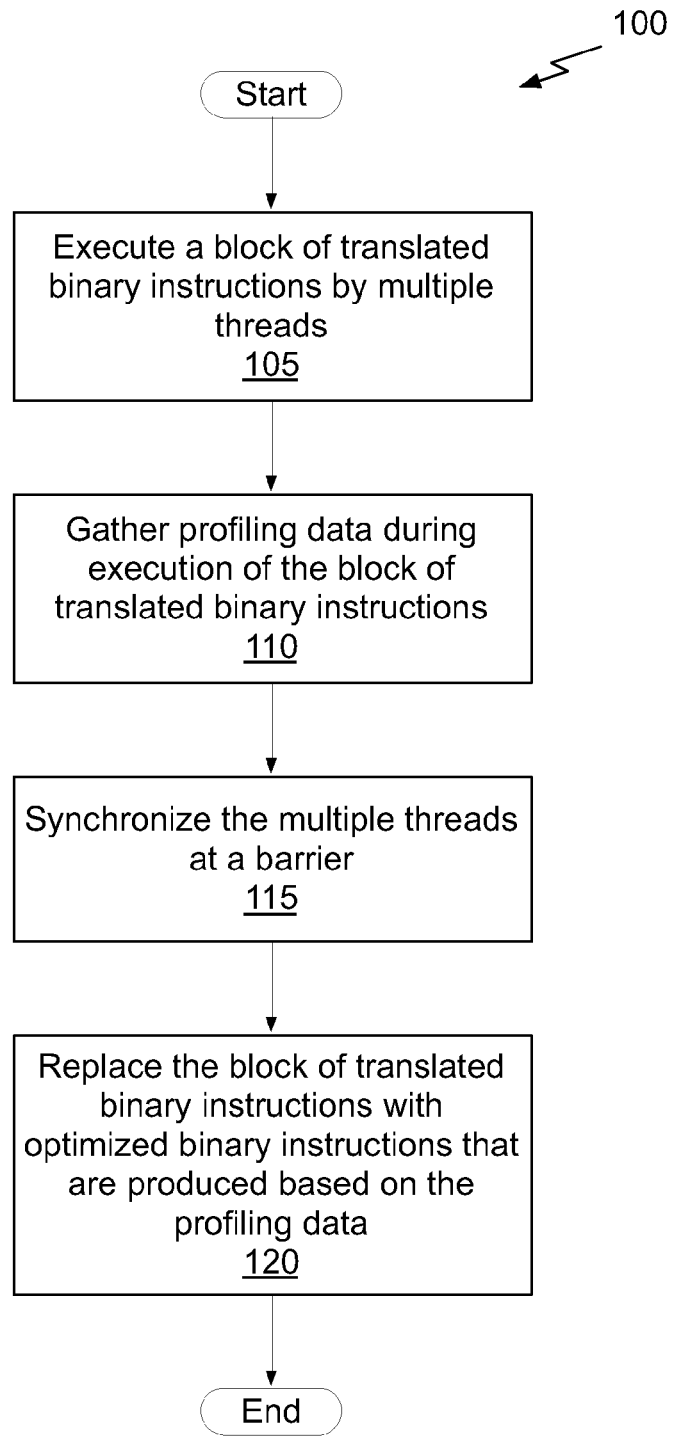
FIG. 1 illustrates a flowchart of a method for dynamically optimizing a binary program, in accordance with one embodiment.

FIG. 1 illustrates a flowchart of a method 100 for dynamically optimizing a binary program, in accordance with one embodiment. In the context of the present description, the program may be represented by one or more blocks of translated binary instructions. Compared with original binary instructions for a program, the translated binary instructions may be configured to include binary instructions based on the particular features supported by a parallel processor or a particular parallel processor configuration (e.g., processor clock rate, processor memory capacity, processor memory bandwidth, and the like). In one embodiment, compared with the original binary instructions, the translated binary instructions may be instrumented to enable gathering of profiling data during execution.

In one embodiment, a block may correspond to a sub-graph of a graph representation of the program (e.g., directed acyclic graph) and the block may be cyclic or acyclic. At step 105, a block of translated binary instructions is executed by multiple threads. The multiple threads may be executed by one or more multithreaded processing cores that are included in a parallel processor. In one embodiment, the parallel processor is a graphics processor. In the context of the present description, different translated binary instructions are executed by the one or more threads during a single clock cycle. Separate program counters may be maintained for each thread. During execution, individual threads included in the multiple threads may take different paths through the block of translated binary instructions.

In one embodiment, an entire program is translated at one time to generate one or more blocks of translated binary instructions including the block of translated binary instructions. In one embodiment, a set of instructions in the program is translated to generate the block of translated binary instructions. The entire program or the set of instructions may be translated by a CPU, by the parallel processor, or by a dedicated hardware unit as the program is loaded into a memory system. In one embodiment, when the block of translated binary instructions will be executed, each thread is configured to translate a set of instructions in the program to generate per-thread instances of the block of translated binary instructions.

At step 110, profiling data is gathered during execution of the block of translated binary instructions. In the context of the present description, the profiling data represents various execution-specific characteristics corresponding to the block of translated binary instructions. For example, counts of the number of times a path through the program is taken, violations of compiler assertions (e.g. that specific memory operations are not dependent, or that floating point operations are within a specific range), branch taken/not-taken probabilities, etc. In one embodiment, additional instructions are inserted into the translated binary instructions to enable gathering of the profiling data (i.e., the block of binary instructions is instrumented during translation).

At step 115, the multiple threads are synchronized at a barrier. In one embodiment, the barrier is represented by a barrier instruction and when each thread of the multiple threads reaches the barrier instruction, the thread stops execution and waits until all of the threads in the multiple threads reach the barrier instruction.

At step 120, the block of translated binary instructions is replaced with optimized binary instructions that are produced based on the profiling data. The optimized binary instructions may be generated by translating and optimizing the original binary instructions based on the profiling data or by optimizing the translated binary instructions based on the profiling data. The optimized binary instructions may be produced by a different processor, such as a CPU or by a thread executing on the parallel processor. In one embodiment, the thread may be a thread that is included in the multiple threads and reaches the barrier before one or more other threads in the multiple threads. In one embodiment, the thread is not included in the multiple threads. The optimized binary instructions may be produced after step 115 or may be produced in parallel with step 110 and completed when all of the threads included in the multiple threads are synchronized at step 115.

The method steps shown in FIG. 1 may be performed by a dynamic translation and optimization system. In one embodiment, the dynamic translation and optimization system includes the parallel processor and a CPU and the translated binary instructions and the optimized binary instructions are produced by the CPU. In another embodiment, the dynamic translation and optimization system includes the parallel processor and the CPU, and the translated binary instructions are produced by the CPU and the optimized binary instructions are produced by the parallel processor. In another embodiment, the dynamic translation and optimization system includes the parallel processor and the CPU, and the translated binary instructions are produced by the parallel processor and the optimized binary instructions are produced by the CPU. In another embodiment, the dynamic translation and optimization system includes only the parallel processor and the translated binary instructions and the optimized binary instructions are produced by the parallel processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
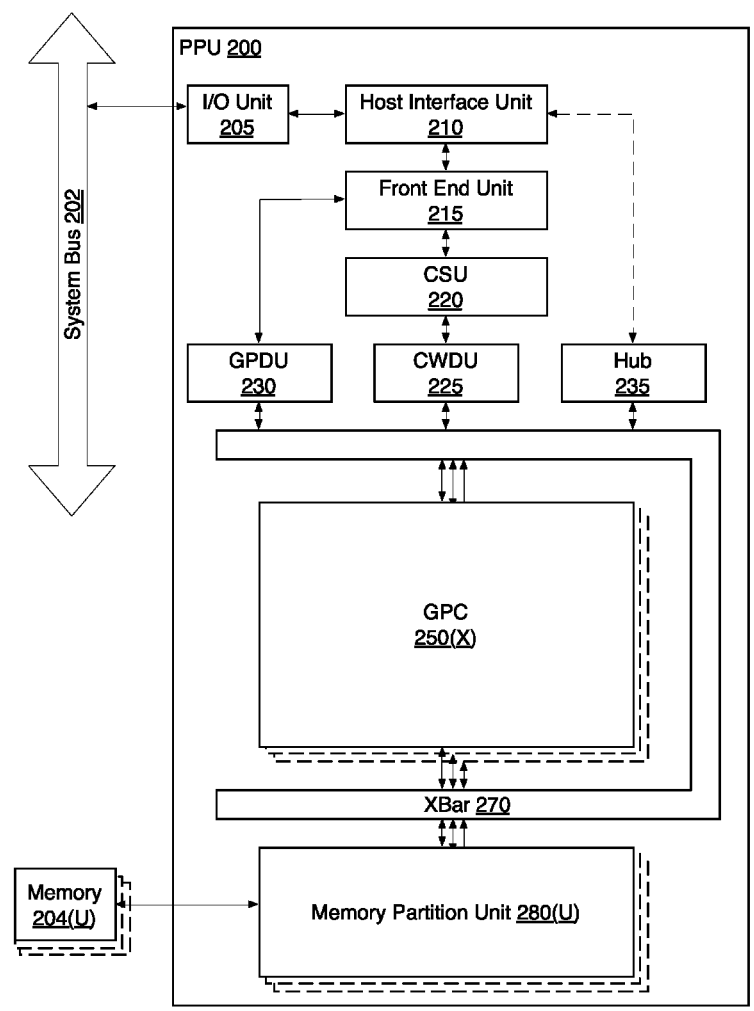
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
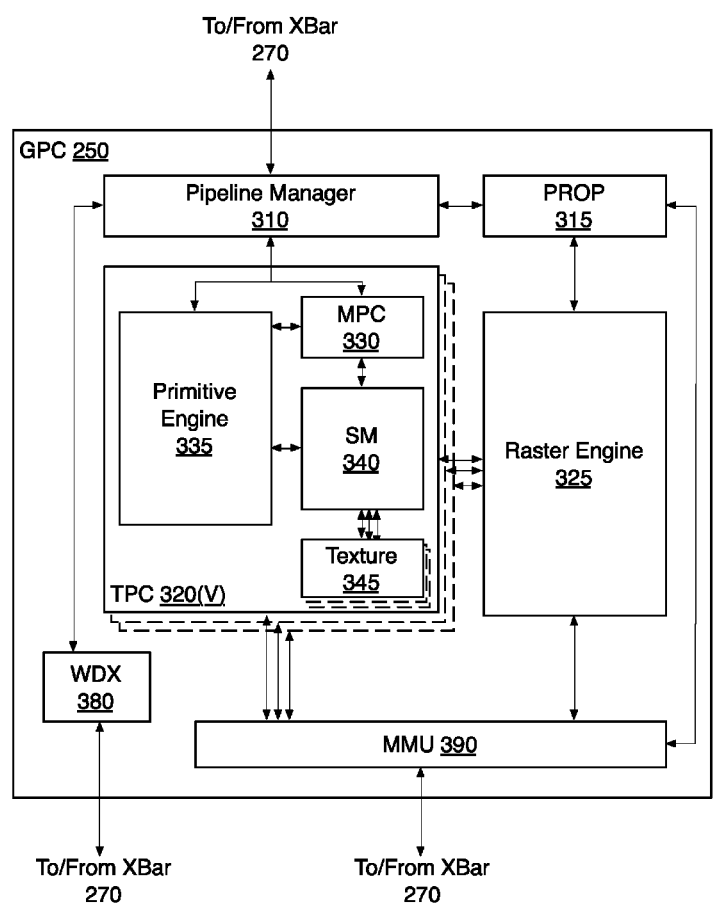
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
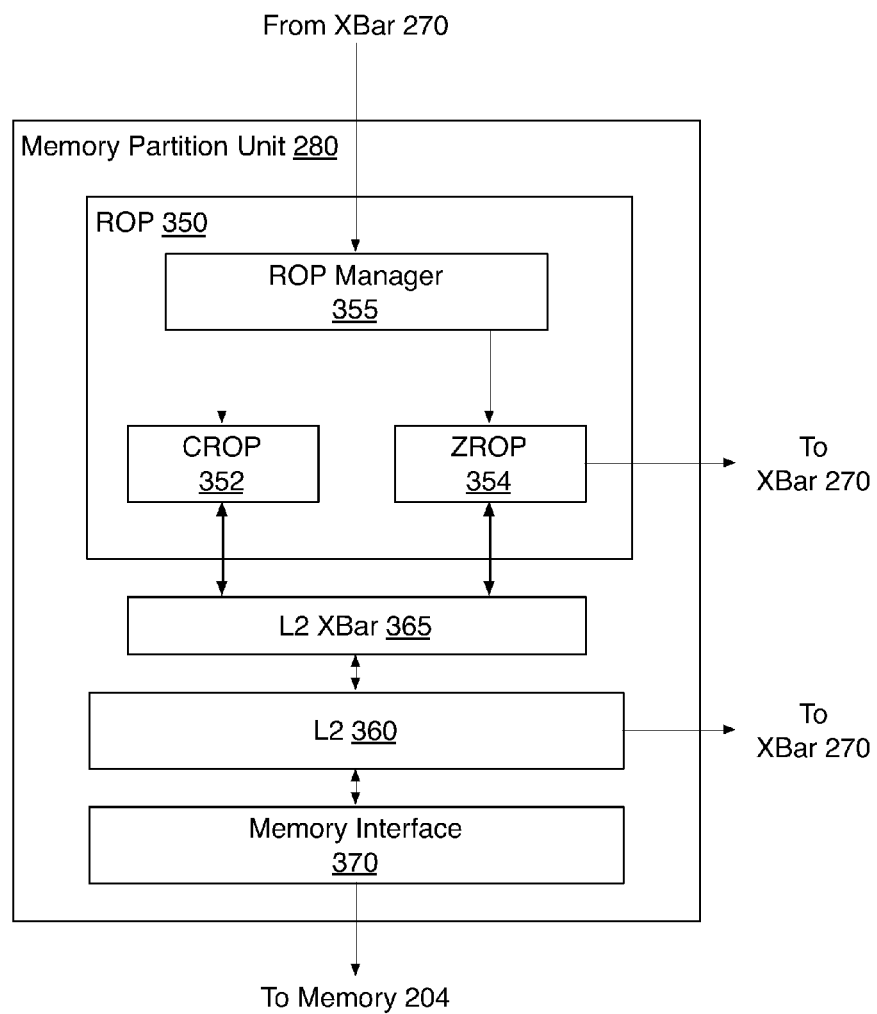
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204.

Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
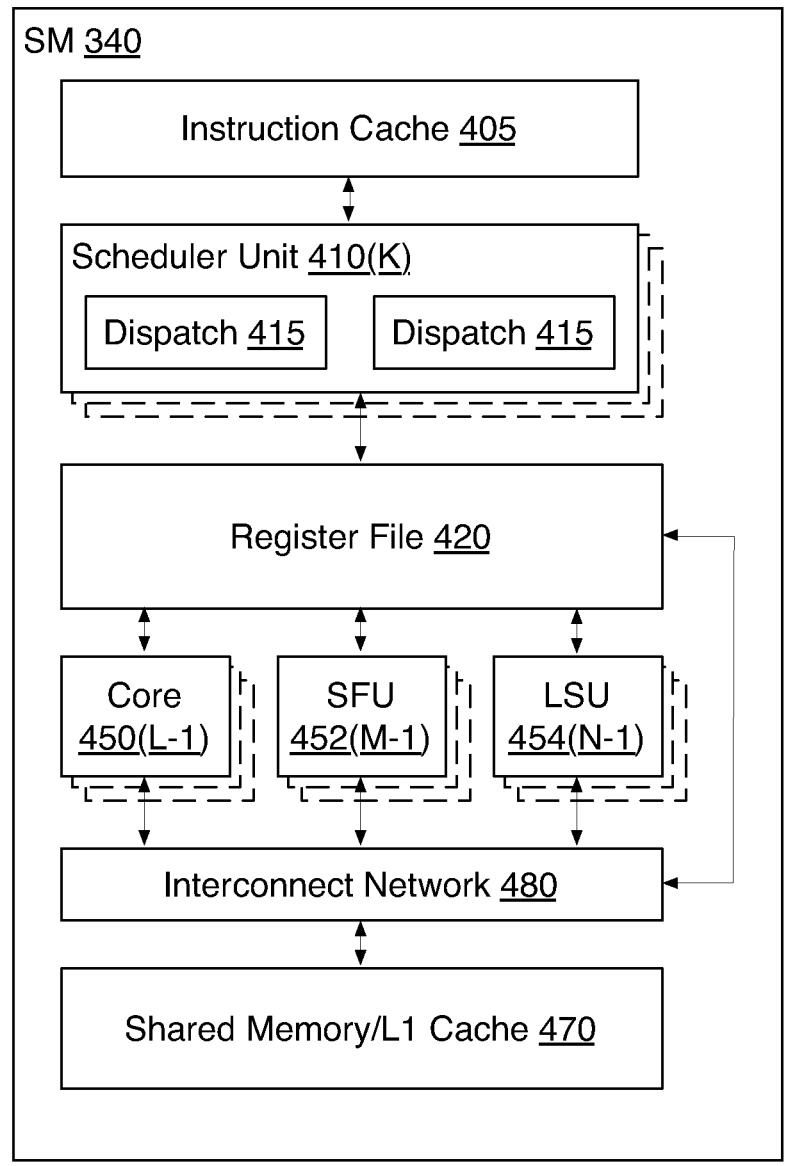
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., pixel blending operations, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Dynamic Program Optimization in a Parallel System

Figure 5A:
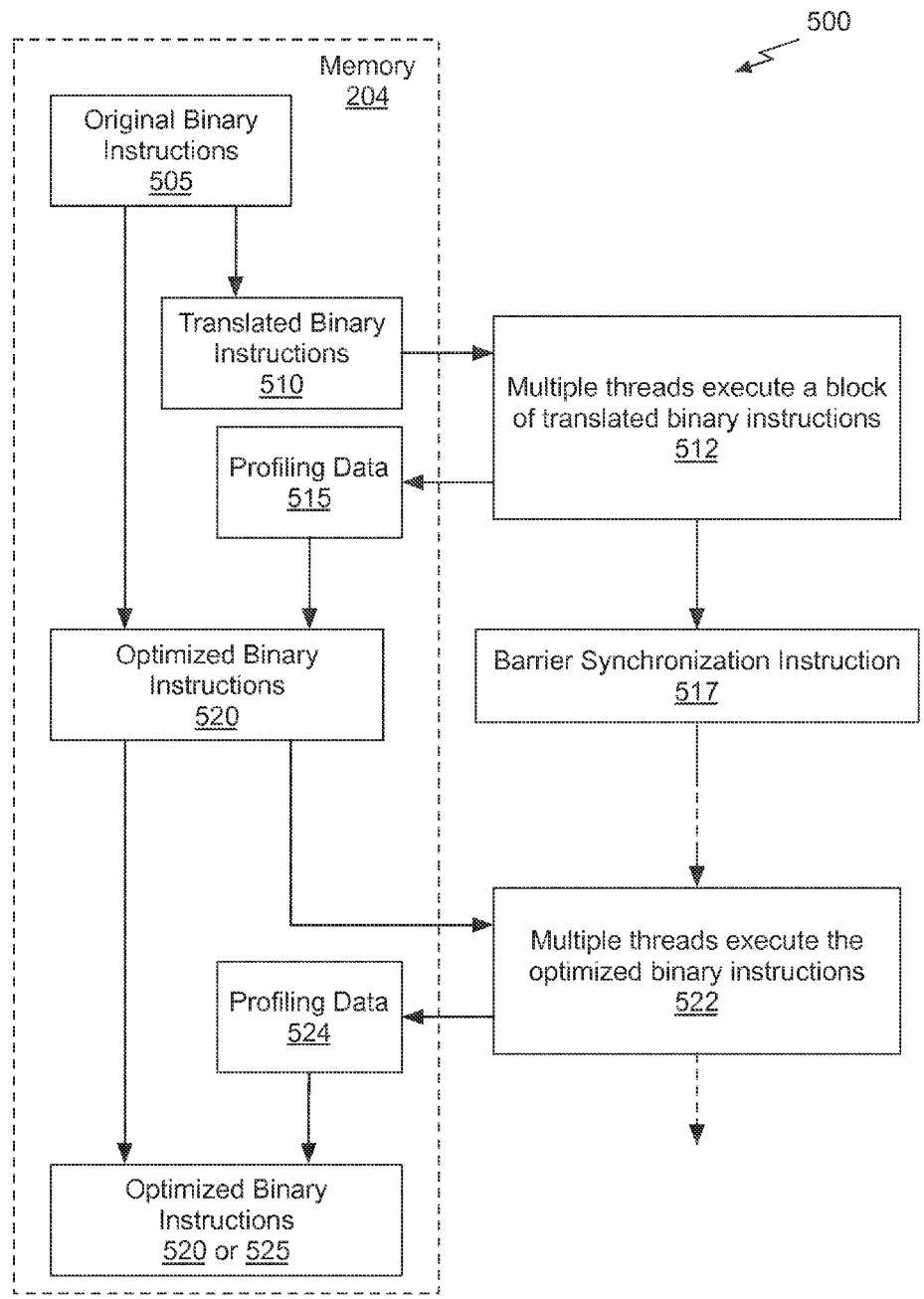
FIG. 5A is a conceptual diagram that illustrates bulk synchronization, in accordance with one embodiment.

FIG. 5A is a conceptual diagram 500 that illustrates bulk synchronization at a barrier, in accordance with one embodiment. The memory 204 stores original binary instructions 505 for a program and translated binary instructions 510 for the program. One or more binary instructions of the translated binary instructions 510 that correspond to a block of the translated binary instructions 512 may be stored in the instruction cache 405. The block of translated binary instructions are executed by multiple threads on a parallel processor at operation 512. During execution of the block of translated binary instructions, profiling data 515 is gathered and stored in the memory 204. In one embodiment, the profiling data 515 may be stored in the shared memory/L1 cache 470 instead of in the memory 204.

The profiling data 515 may be gathered through hardware performance counters or using software instrumentation. The counters may be configured to record profiling data for each thread in parallel and then encode the profiling data for a particular characteristic as a value. The values corresponding to one or more characteristics may be used to perform the dynamic program optimization and produce the optimized binary instructions 520.

In one embodiment, the optimized binary instructions 520 are produced during the operation 512 based on the profiling data 515 and the original binary instructions 505. A block of the original binary instructions 505 that corresponds to the block of translated binary instructions being executed should be indicated in the original binary instructions 505. During the dynamic translation and optimization process, the block of the original binary instructions 505 is translated and optimized. When the original binary instructions 505 are not stored in a bytecode format (i.e., are stored in a machine executable binary format), the original binary instructions 505 are converted into bytecode as part of the dynamic translation and optimization process, and all subsequent optimizations start from the bytecode representation. Optimizations may be more easily applied to a bytecode format compared with a machine executable binary format.

In another embodiment, the optimized binary instructions 520 are produced during the operation 512 based on the profiling data 515 and the translated binary instructions 510. The optimized binary instructions 520 may be produced by a dynamic translation and optimization system comprising a program executed by a thread on the parallel processor or on another processor, such as a CPU. Furthermore, in one embodiment, the translated binary instructions 510 may be generated by the dynamic translation and optimization system. The translated binary instructions 510 may be copied by the dynamic translation and optimization system and optimized to produce the optimized binary instructions 520.

In another embodiment, translation of the original binary instructions 505 is distributed and a per-thread instance of the translated binary instructions 510 is generated by each thread just before the thread executes the block of translated binary instructions at operation 512. The per-thread instances should be identical, and one of the per-thread instances may be copied by the dynamic translation and optimization system for optimization to produce the optimized binary instructions 520.

In one embodiment, the optimized binary instructions 520 are produced after the operation 512. As previously described, the optimized binary instructions 520 may be produced based on the profiling data 515 and the original binary instructions 505 or based on the profiling data 515 and the translated binary instructions 510. The optimized binary instructions 520 may be produced by a thread on the parallel processor or on another processor, such as a CPU.

In one embodiment, the optimized binary instructions 520 are produced after the operation 512. As previously described, the optimized binary instructions 520 may be produced based on the profiling data 515 and the original binary instructions 505 or based on the profiling data 515 and the translated binary instructions 510. The optimized binary instructions 520 may be produced by a thread on the parallel processor or on another processor, such as a CPU.

When each thread of the multiple threads reaches a barrier synchronization instruction at operation 517, the thread stops execution of the block of translated binary instructions and waits for all of the threads of the multiple threads to reach the barrier synchronization instruction at operation 517. The threads may take different paths through the block of translated binary instructions and may reach the barrier synchronization instruction at operation 517 through different paths. However, the block of translated binary instructions should be defined such that all of the threads in the multiple threads will reach the barrier synchronization instruction at operation 517.

When all of the threads have reached the barrier synchronization instruction at operation 517, optimized binary instructions 520 may replace the translated binary instructions 510. In one embodiment, the barrier synchronization instruction may specify a branch instruction and the branch address may be modified to correspond to the optimized binary instructions 520 instead of the translated binary instructions 510. For example, a barrier synchronization instruction (not shown) that specified a branch to the block of translated binary instructions that are executed at operation 512, may be modified to point to the optimized binary instructions 520 so that subsequently executed threads will execute the optimized binary instructions 520 instead of the translated binary instructions 510.

To ensure that the optimized binary instructions 520 correctly replace the translated binary instructions 510 the instruction memory hierarchy should be synchronized. The instruction memory hierarchy includes any memory in which the binary instructions may be stored and accessed by the multiple threads (e.g., one or more of the instruction cache 405, the shared memory/L1 cache 470, the L2 360, and the memory 204). In one embodiment, the memory hierarchy may be synchronized by invalidating cache entries that store (translated or optimized) binary instructions.

Once the barrier synchronization instruction operation 517 is completed, the multiple threads resume execution and the translated binary instructions 510 may be discarded. The multiple threads may return to execute the optimized binary instructions 520 or the multiple threads may execute a different block of (translated or optimized) binary instructions. At some point during execution of the program, as shown in FIG. 5A, the multiple threads may execute the optimized binary instructions 520 at operation 522. When each thread executes the optimized binary instructions 520, the translation operation is not performed.

During execution of the optimized binary instructions 520 profiling data 524 is generated. The profiling data 524 is specific to execution of the optimized binary instructions 520, and therefore may differ compared with the profiling data 515. When the profiling data 524 substantially matches the profiling data 515, the dynamic translation and optimization system may determine that further optimization is not needed and the optimized binary instructions 520 are not replaced. In one embodiment, when corresponding counter values in the profiling data 515 and the profiling data 524 are each within a threshold amount (i.e., an integer greater than or equal to zero) of each other, the profiling data 524 is determined to substantially match the profiling data 515.

When the profiling data 524 does not substantially match the profiling data 515, the dynamic translation and optimization system may determine that further optimization is needed, and the dynamic translation and optimization system may replace the optimized binary instructions 520 with optimized binary instructions 525. In one embodiment, the dynamic translation and optimization system copies the optimized binary instructions 520 and produces the optimized binary instructions 525 based on the profiling data 524. In another embodiment, the dynamic translation and optimization system copies the original binary instructions 505 or the translated binary instructions 510 and produces the optimized binary instructions 525 based on the profiling data 524. In yet another embodiment, the dynamic translation and optimization system uses a combination of the original binary instructions 505 and the optimized binary instructions 520 to produce the optimized binary instructions 525 based on the profiling data 524. For example, if the profiling data 524 differs significantly compared with the profiling data 515, the dynamic translation and optimization system may start optimization from one of the original binary instructions 505, r the translated binary instructions 510, or the optimized binary instructions 520. The optimized binary instructions 525 may be produced by a thread on the parallel processor or on another processor, such as a CPU.

Figure 5B:
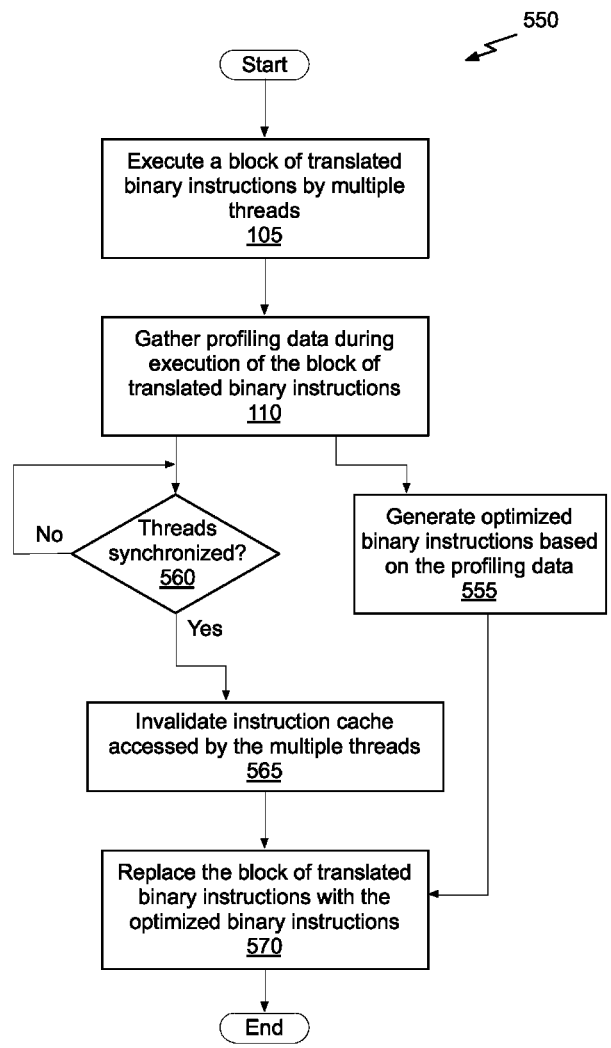
FIG. 5B illustrates a flowchart of another method for dynamically optimizing a binary program, in accordance with one embodiment.

FIG. 5B illustrates a flowchart of another method 550 for dynamically optimizing a binary program, in accordance with one embodiment. The steps shown in method 550 may be performed by circuitry, software, or a combination of circuitry and software. Steps 105 and 110 are completed as previously described. At step 560, the dynamic translation and optimization system determines if the multiple threads are synchronized at a barrier. Each thread of the multiple threads may independently perform steps 105 and 110 so that the multiple threads do not necessarily reach the barrier during the same clock cycle. Step 560 is repeated until all of the threads are synchronized.

At step 565, the dynamic translation and optimization system invalidates at least the instruction cache 405 that is accessed by the multiple threads. In one embodiment, the instruction memory hierarchy is synchronized by invalidating or otherwise updating additional memory and/or storage resources in the instruction memory hierarchy. At step 555, the dynamic translation and optimization system generates the optimized binary instructions based on the profiling data. Step 555 may be performed in parallel with steps 110, 560, and 565. At step 570, the block of translated binary instructions is replaced with the optimized binary instructions.

As previously explained, the block of translated binary instructions or a block of optimized binary instructions should only be replaced when no threads are accessing the instructions. Therefore, if a first set of multiple threads and a second set of multiple threads are executing simultaneously, and both of the sets may access the translated binary instructions, both of the sets should be synchronized at step 560. Alternatively, a separate copy of the block of translated or optimized binary instructions may be associated with each one of the sets of multiple threads.

In one embodiment, barriers may be implemented at the warp level, so that all threads in the same warp are synchronized and a thread that is not in the same warp is not synchronized with the threads that are in the warp. A barrier hierarchy may be supported, so that threads may be synchronized at one or more of a warp level, a multi-warp (SM) level, a TPC level, a GPC level, and a top (PPU) level. A synchronization level of a barrier may be specified by the barrier. As previously explained, the scheduler unit 410 schedules threads for execution in groups of parallel threads, where each group is called a warp. The scheduler unit 410 may manage a plurality of different warps, scheduling the warps for execution and determining when all of the threads in a warp are synchronized at a barrier. When a warp level barrier is specified, the scheduler unit 410 within an SM 540 enforces synchronization for all of threads within the warp. When a SM level barrier is specified, the scheduler units 410 within an SM 540 enforce synchronization for the warps being executed by the SM 540, so that all of the threads being executed by the SM 540 are synchronized at the SM level barrier. Similarly, when a GPC level barrier is specified, the scheduler units 410 within a GPC 250 enforce synchronization for the warps being executed by the GPC 250. Finally, when a PPU level barrier is specified, all of the scheduler units 410 within a PPU 200 enforce synchronization for the warps being executed by the PPU 200, so that all of the threads are synchronized.

When synchronization is performed at a level other than the top level, a version of the optimized binary instructions may be produced and stored at the lower level at which the barrier is enforced. Convergence between the potentially different versions at a lower level may be achieved by merging the versions to produce a single version of the optimized binary instructions at the top level. Over time, different versions of optimized binary instructions for each block of a program may be produced at one or more lower levels and successively merged at each higher level to produce an optimized program of optimized blocks of binary instructions at the top level or at level between the top level and the warp level. When lower level versions of optimized binary instructions may be produced, the dynamic program optimization may be performed in a distributed manner.

Figure 6A:
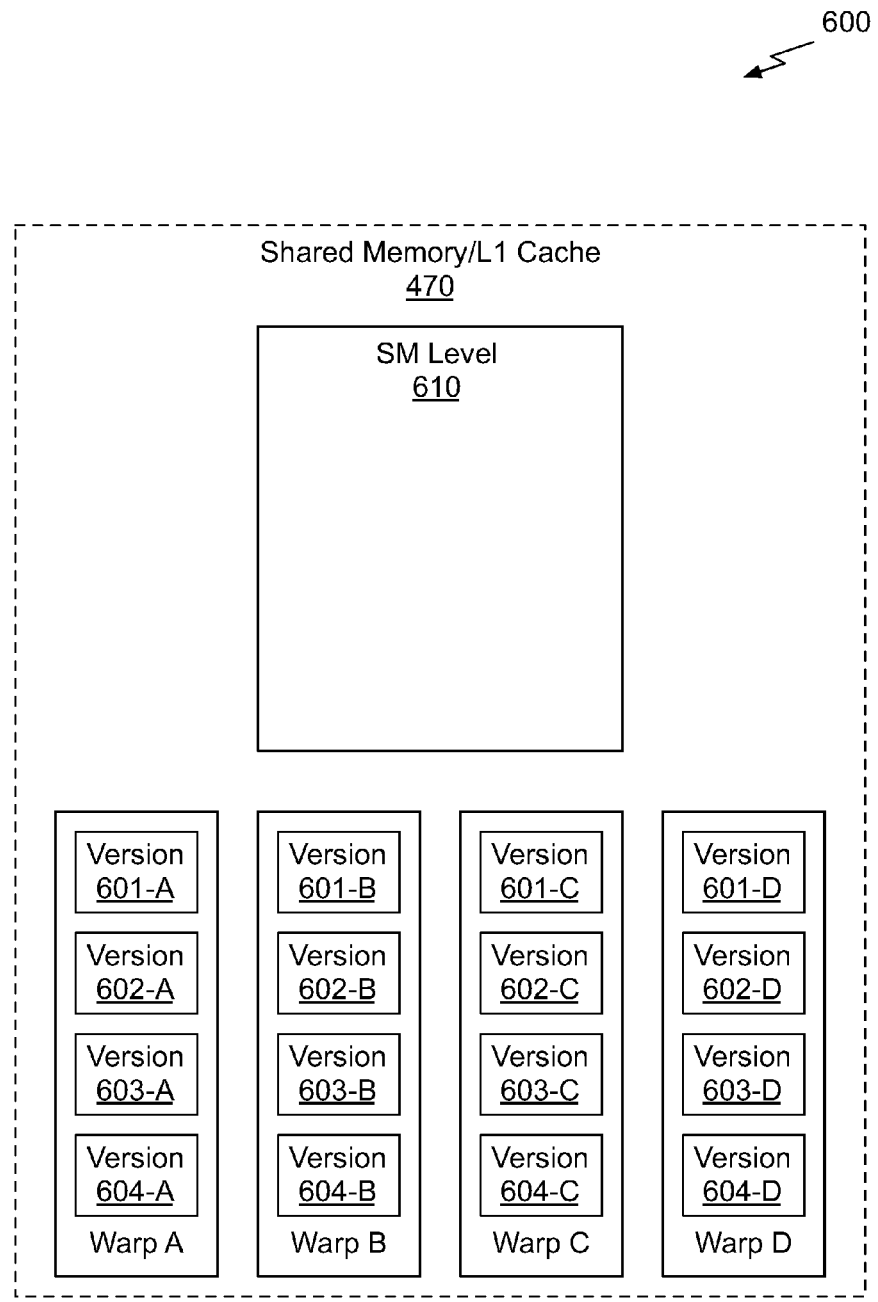
FIG. 6A is a conceptual diagram that illustrates versions of optimized binary instructions for blocks, in accordance with one embodiment.

FIG. 6A is a conceptual diagram 600 that illustrates versions of optimized binary instructions for blocks, in accordance with one embodiment. When warp level barriers are used, each warp may produce and store a version of optimized binary instructions for each block of a program. As shown in FIG. 6A, four warps A, B, C, and D may each store a version of optimized binary instructions for blocks 601, 602, 603, and 604. In one embodiment, the per-warp versions of optimized binary instructions are stored in shared memory/L1 cache 470. The versions 601-A, 602-A, 603-A, and 604-A may be stored in a portion of the shared memory/L1 cache 470 that is allocated to warp A. Similarly the respective versions 601, 602, 603, and 604 are stored in portions of the shared memory/L1 cache 470 that is allocated to the respective warps B, C, and D. A portion of the shared memory/L1 cache 470, SM level 610, may be allocated to store SM level versions of optimized binary instructions for blocks of the program. In another embodiment, the versions of optimized binary instructions for blocks are stored in the memory 204 and/or the L2 cache 360.

Figure 6B:
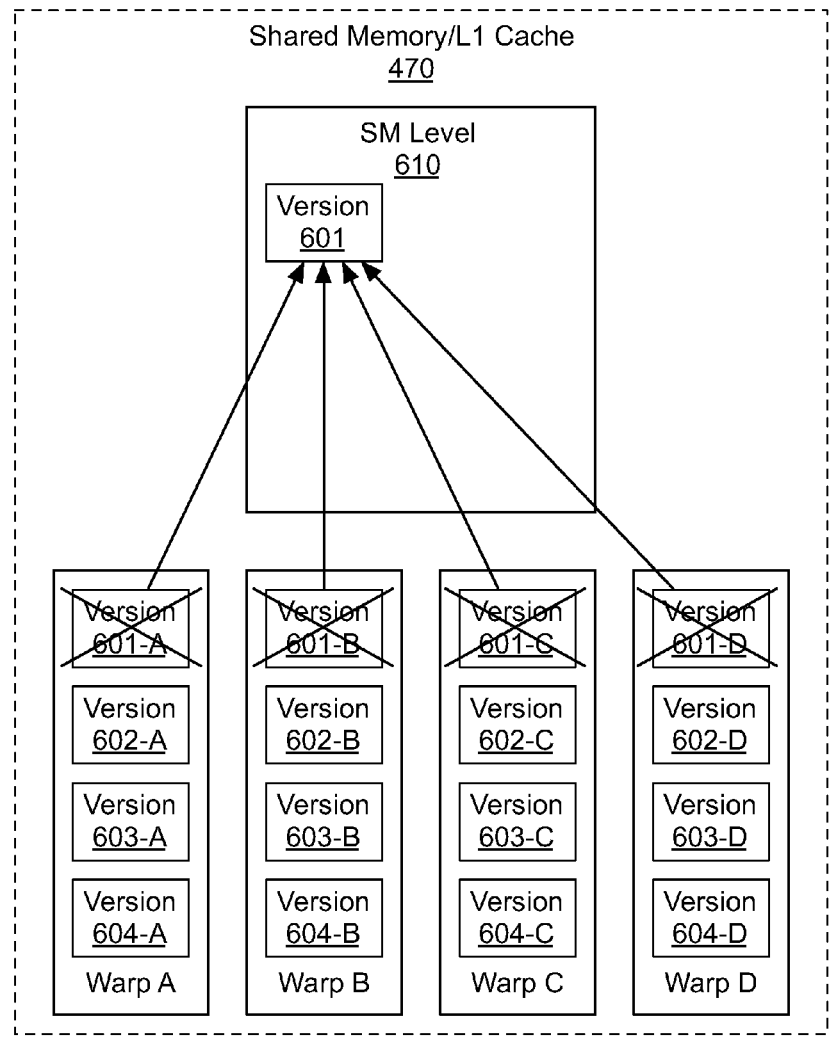
FIG. 6B illustrates merging of the versions of the optimized binary instructions for blocks shown in FIG. 6A, in accordance with one embodiment.

FIG. 6B illustrates merging of the versions of the optimized binary instructions for blocks shown in FIG. 6A, in accordance with one embodiment. Whenever a new version of optimized binary instructions are produced for a block, the dynamic translation and optimization system may attempt to merge the new version with other versions of the optimized binary instructions for the block. For example, when all of the threads in warp A are synchronized and a new version of optimized binary instructions for a first block is generated, version 601-A, the dynamic translation and optimization system may compare version 601-A with the versions 601-B, 601-C, and 601-D to determine if the different versions may be merged. When each binary instruction in a version of optimized binary instructions for a first block produced for a first warp matches the binary instructions in a version of optimized binary instructions for the first block produced for a second warp, the versions may be merged. In one embodiment, identical versions of the optimized binary instructions are merged. In another embodiment, the versions of the optimized binary instructions need not be identical to be merged. Because a block defines a series of operations that transform an explicit set of input values into an explicit set of output values, and all versions of optimized binary instructions for the block must perform the same function, versions of optimized binary instructions that are different can merged. When versions of optimized binary instructions are merged, one version of the optimized binary instructions may be retained as the merged version and other versions of optimized binary instructions are discarded. Alternatively, a more complex merge operation may be performed where pieces from different versions of optimized binary instructions are stitched together to produce the merged version.

As shown in FIG. 6B, a SM level barrier synchronizes four warps, warps A, B, C, and D. In other embodiments, more or fewer warps may be synchronized by a SM level barrier. When versions 601-A, 601-B, 601-C, and 601-D for a first block are merged, a version 601 that is the merged version for the first block is stored at the SM level 610 and the versions 601-A, 601-B, 601-C, and 601-D may be removed. When the first block is subsequently executed in the SM 340 by a thread, the thread executes the version 601 stored at the SM level 610. The merged version at the SM level 610 may be compared with other versions of the optimized binary instructions for the first block that are stored at the SM level for other SMs 340 so that the SM level versions may be merged to produce a higher level version for the first block, and so on.

Figure 6C:
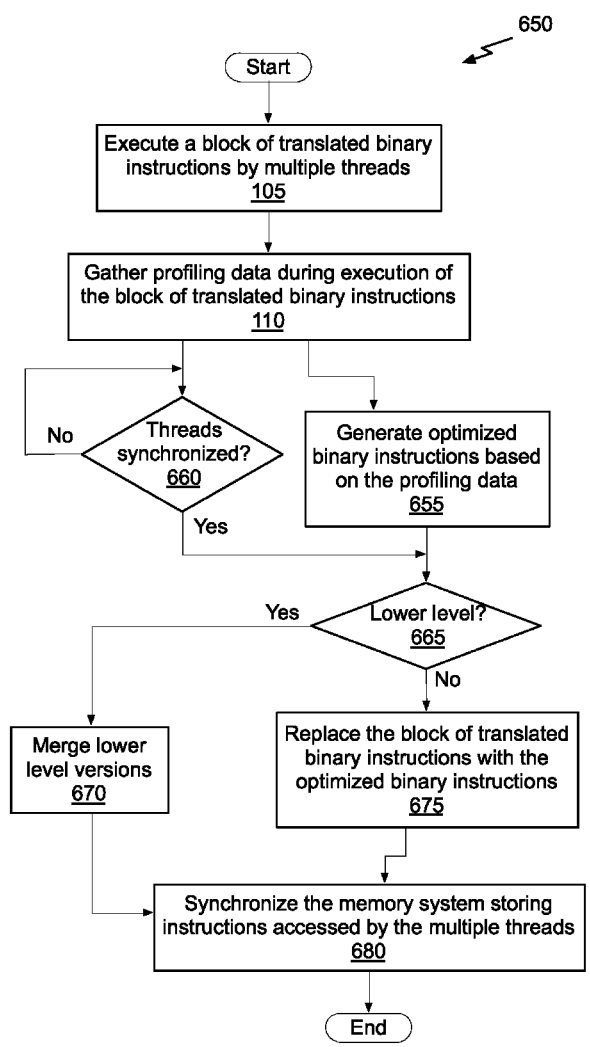
FIG. 6C illustrates a flowchart of another method for dynamically optimizing a binary program, in accordance with one embodiment.

FIG. 6C illustrates a flowchart of another method 650 for dynamically optimizing a binary program, in accordance with one embodiment. The steps shown in method 650 may be performed by circuitry, software, or a combination of circuitry and software. Steps 105 and 110 are completed as previously described. At step 660, the dynamic translation and optimization system determines if the multiple threads are synchronized at a barrier. The barrier may be specified at a particular level when a barrier hierarchy is supported. When a barrier hierarchy is supported, the multiple threads are synchronized at the specified barrier level. Step 660 is repeated until the multiple threads are synchronized at the specified barrier level. When the barrier is an SM level barrier, the multiple threads are the threads in warps executed on one SM 340. When the barrier is a GPC level barrier, the multiple threads are the threads in warps executed on one GPC 250. When the barrier is a PPU (top) level barrier, the multiple threads are the threads in warps executed in the PPU 200 (i.e., all threads).

At step 665, the dynamic translation and optimization system determines if a lower level barrier is supported, and, if so, at step 670, the dynamic translation and optimization system merges versions at the lower barrier level to produce a version at the specified level. The dynamic translation and optimization system may successively merge versions at each lower level until a merged version is generated at the specified level. Versions for a block can be merged at any level up to the specified level because the threads that may access the versions for the block are synchronized at the specified level and levels that are lower than the specified level. In one embodiment, as each thread reaches the barrier, the thread begins the merging operation by comparing the version executed by the thread with other versions for the same block, so that the merging may be performed while one or more threads are still executing the version (translated binary instructions or previously optimized binary instructions) for the block.

For example, a first thread included in warp A that has reached an SM level barrier may atomically store a newly produced version 601-A (produced at step 655) to the next highest level of the program (e.g., the SM level 610). In one embodiment, the version 601-A is described by a structure in the form {block id, pointer to block data, optimization level}. The warp A is able to successfully store the version 601-A because there is no entry for the block. When warps B, C, and D reach the SM level barrier, each warp attempts to atomically store a structure describing a respective version of 601. If any of the versions 601-B, 601-C, and 601-D have higher optimization levels compared with the version 601-A, the warps B, C, and/or D perform an atomic store operation to replace the version 601 at the SM level 610. If the versions 601-B, 601-C, and 601-D have lower optimization levels, the version may be discarded. At the end of the SM level barrier, warps A, B, C, and D will all use the updated version 601 from the SM level 610.

If, at step 665, the dynamic translation and optimization system determines that a lower level barrier is not supported (i.e., the warp level was specified for the barrier) and, if so, at step 670, the dynamic translation and optimization system proceeds directly to step 675. At step 675, the block of translated binary instructions is replaced with the optimized binary instructions.

At step 655, the dynamic translation and optimization system generates the optimized binary instructions based on the profiling data. Step 655 may be performed in parallel with steps 110, 660, and 665. At step 680, the memory system storing instructions that are accessed by the multiple threads is synchronized. The memory system should be synchronized at a level corresponding to level specified for the barrier. For example, when the barrier is specified at the warp level, at least the instruction cache 405 should be invalidated.

Dynamic generation of optimized binary code for blocks of a program may be distributed between different threads and versions of the optimized binary code may be merged to produce an optimized binary code for the program. Support for versions of the optimized binary code enables execution of the threads without requiring synchronization of all threads executing in a processor to replace a block of the program with dynamically optimized binary code. Instead, the threads may be synchronized using barriers at different levels of a barrier hierarchy to replace a block of binary instructions with optimized binary instructions.

Figure 7:
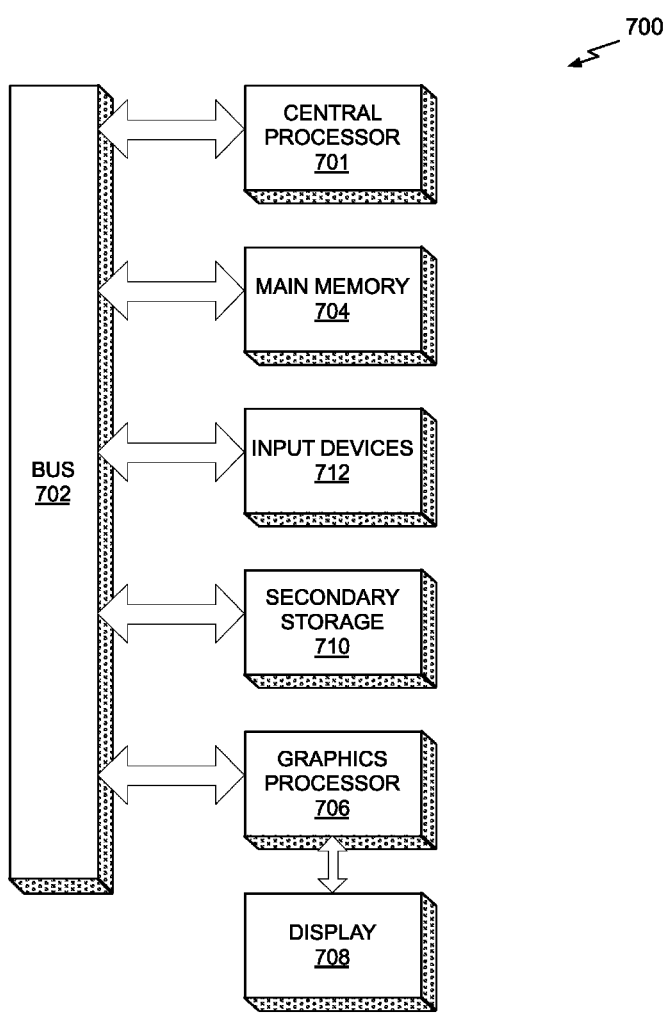
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 1008, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   executing, on a parallel processor, a block of translated binary instructions by multiple threads;
   gathering profiling data during execution of the block of translated binary instructions;
   synchronizing the multiple threads at a barrier instruction associated with the block of translated binary instructions, wherein the barrier instruction specifies a barrier hierarchy level;
   replacing the block of translated binary instructions with optimized binary instructions, wherein the optimized binary instructions are produced based on the profiling data;

determining a lower level barrier than the specified barrier hierarchy level is supported; and comparing the optimized binary instructions with one or more versions of binary instructions for the block that are associated with different multiple threads.

2. The method of claim 1, further comprising executing a second block of translated binary instructions by at least one thread during the synchronizing of the multiple threads and the replacing of the block.

3. The method of claim 1, further comprising merging the optimized binary instructions with versions of binary instructions when the comparing indicates that the optimized binary instructions substantially match the one or more versions of binary instructions.

4. The method of claim 3, wherein the merging comprises copying the optimized binary instructions to a portion of memory corresponding to the specified barrier hierarchy level and removing the optimized binary instructions and the one or more versions of binary instructions for the block from a portion of memory corresponding to the lower level barrier.

5. The method of claim 1, further comprising, after the synchronizing, invalidating an instruction cache that is accessed by the multiple threads.

6. The method of claim 1, wherein the optimized binary instructions are produced by a thread executing on a second processor.

7. The method of claim 1, wherein the parallel processor is a graphics processing unit.

8. The method of claim 1, further comprising, prior to executing the block of translated binary instructions, generating an instance of the block of translated binary instructions by each of the multiple threads.

9. The method of claim 1, further comprising:
copying the block of translated binary instructions; and
producing the optimized binary instructions based on the profiling data and the translated binary instructions.

10. The method of claim 9, wherein the optimized binary instructions are produced during execution of the block of translated binary instructions.

11. A non-transitory computer-readable storage medium storing instructions that, when executed by a processor, cause the processor to perform steps comprising
executing a block of translated binary instructions by multiple threads;
gathering profiling data during execution of the block of translated binary instructions;
synchronizing the multiple threads at a barrier instruction associated with the block of translated binary instructions, wherein the barrier instruction specifies a barrier hierarchy level;
replacing the block of translated binary instructions with optimized binary instructions, wherein the optimized binary instructions are produced based on the profiling data;
determining a lower level barrier than the specified barrier hierarchy level is supported; and
comparing the optimized binary instructions with one or more versions of binary instructions for the block that are associated with different multiple threads.

12. A system comprising:
a memory configured to store a block of translated binary instructions; and
a plurality of multithreaded processing units that are included within a parallel processor and are coupled to the memory and configured to:
execute the block of translated binary instructions by multiple threads;
gather profiling data during execution of the block of translated binary instructions;
synchronize the multiple threads at a barrier instruction associated with the block of translated binary instructions, wherein the barrier instruction specifies a barrier hierarchy level;
replace the block of translated binary instructions with optimized binary instructions, wherein the optimized binary instructions are produced based on the profiling data;
determine a lower level barrier than the specified barrier hierarchy level is supported; and
compare the optimized binary instructions with one or more versions of binary instructions for the block that are associated with different multiple threads.

13. The system of claim 12, wherein the plurality of processing cores are further configured to execute a second block of translated binary instructions by at least one thread during the synchronizing of the multiple threads and the replacing of the block.

14. The system of claim 12, wherein the plurality of multithreaded processing unit are further configured to merge the optimized binary instructions with the one or more versions of binary instructions when the comparing indicates that the optimized binary instructions substantially match the one or more versions of binary instructions.

15. The system of claim 12, wherein the plurality of multithreaded processing units are further configured to invalidate an instruction cache that is accessed by the multiple threads after the multiple threads are synchronized.

16. The system of claim 12, further comprising a second processor that executes a thread to produce the optimized binary instructions.

* * * * *